April 11, 1967          F. W. ROHE          3,313,078
MOLDED-IN INSERT WITH FLOATING NUT
Filed March 30, 1964
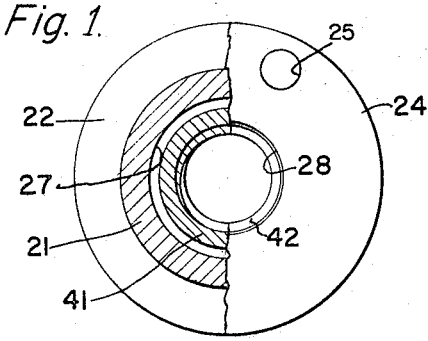
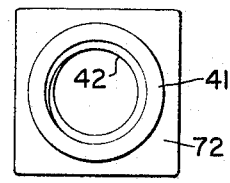
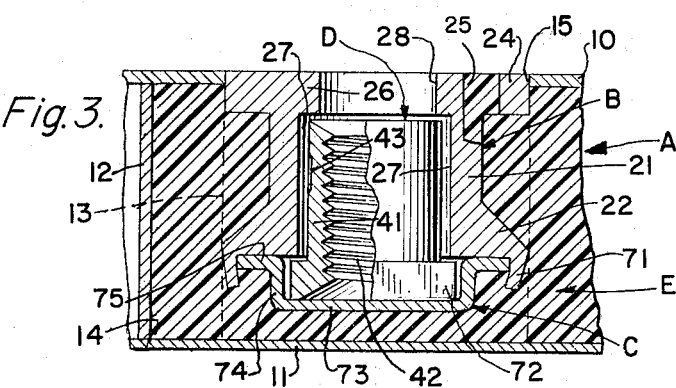
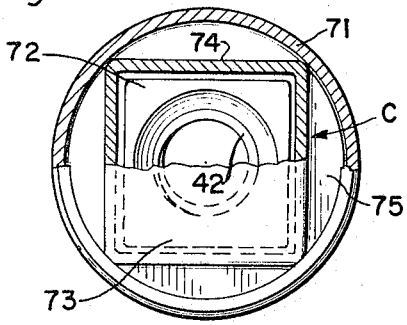
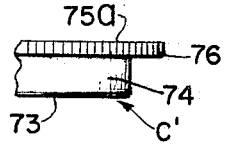
INVENTOR:
FREDERICK W. ROHE,
BY
*Lynn H. Latta*
ATTORNEY.

United States Patent Office 3,313,078
Patented Apr. 11, 1967

3,313,078
MOLDED-IN INSERT WITH FLOATING NUT
Frederick W. Rohe, 5191 S. Bradford,
Placentia, Calif. 92670
Filed Mar. 30, 1964, Ser. No. 355,809
5 Claims. (Cl. 52—617)

This invention relates to insert type fasteners for installation in lightweight sandwich panel structure and has as its general object to provide an improved molded-in insert of the floating nut type.

A specific object is to provide such an insert having a shell that can be fabricated by screw machine and milling operations and does not require the use of die-casting or forging dies.

Another object is to provide such an insert having improved means for sealing the inner end of the shell to provide a closed nut-retaining chamber into which the potting compound or adhesive cannot penetrate during the molding-in operation of installing the insert in a panel.

Other objects and advantages will become apparent in the ensuing specification and appended drawings in which:

FIG. 1 is a plan view, partially in cross-section, of a form of the invention;

FIG. 2 is a plan view of the floating nut of FIG. 1;

FIG. 3 is a cross sectional view of a sandwich panel installation utilizing the insert of FIG. 1;

FIG. 4 is an inverted plan view of the insert of FIG. 1, with parts broken away and shown in section; and FIG. 5 is a fragmentary side view of the end cap part of FIG. 1, in a modified form thereof.

Referring now to the drawing in detail and in particular to FIGS. 1 and 3 thereof, I have shown therein, as an example of one form in which the invention may be embodied, an insert adapted for installation in a lightweight sandwich panel A, said insert comprising, in general, a shell B having an outer end fitted into an opening in one of the skin sheets of sandwich panel A; a cap C of sheet material closing the inner end of the shell B and cooperating with the latter to define a socket; and a nut D which is anchored for floating, self aligning movements within such socket. In the panel and insert installation, the hole 13 around the insert B–D, and the communicating pockets 14 are filled with a body of potting compound or adhesive E which is preferably of a solidified epoxy resin but can be of any equivalent adhesive or cement material.

Sandwich panel A is of a type comprising spaced skin sheets 10 and 11 attached to opposite sides of a lightweight core 12 which may consist of a honeycomb structure of thin ribbon material providing a series of honeycomb walls extending transversely between the skin sheets 10 and 11 and having the opposite edges of the ribbon material suitably secured to the inner faces of the skin sheets. In preparation for the installation of one of the inserts B–D, a hole 13 is drilled or lanced through the skin sheet 10 and through the lightweight core material 12, terminating at the inner face of the opposite skin sheet 11 or near the same, depending upon whether the insert has an axial length substantially equal to or somewhat less than the thickness of the panel A. Where the core material 12 is of the honeycomb wall structure referred to above, the hole 13 will cut through a number of honeycomb walls, leaving pockets 14 defined between the periphery of the hole 13 and the walls of core 12 radiating outwardly therefrom. The hole 13 has a mouth defined by an aperture 15 in the skin sheet A. Preferably this aperture is circular and the hole 13 is defined by cut edges of the core walls 12 in a cylindrical array.

Shell B comprises a cylindrical tubular body portion 21 having at its inner end a thickened collar portion 22 projecting radially outwardly from body 21; and a head 24 in the form of a flat circular flange with a cylindrical periphery which is fitted closely in the skin sheet aperture 15 and provides a closure for the hole 13. Extending through the head 24, parallel to the wall of tubular body 21 and externally thereof, is a port 25 through which the potting compound E is injected in liquid form during the installation of the insert, in a process which may be approximately as described in my Patent No. 3,016,578, issued January 16, 1962. A similar port (not shown) is preferably provided at a diametrically opposite point in head 24, for the escape of air from the hole 13, ahead of the body of potting compound as it fills the hole.

Head 24 includes a radially inwardly projecting annular retainer lip 26 which overhangs the outer end of the nut D to retain the same in a socket 27 which is defined within the shell. The inner margin of lip 26 defines an aperture 28 for entry of a bolt into the shell B, for coupling to the nut D.

End cap C is of formed sheet material such as stamped aluminum alloy sheet, with a suitable anodized or equivalent finish, is of non-circular form, and is coupled to the shell B to define a non-circular socket portion for nut D.

Cap C completely closes the inner end of socket 27 so as to exclude the potting material E therefrom when it is being injected into the hole 13 in liquid form. Thus, only the outer end of the shell is open, at 28.

Nut D comprises a cylindrical tubular body 41, internally threaded at 42, a thread locking section 43 which may embody any known thread locking means; and a non-circular head 72 at its inner end, loosely received in cap C and coupling the nut D to the shell B in a floating condition such that the nut may have limited rotational and lateral translational movements with reference to the shell B for self-alignment with respect to a bolt inserted through aperture 28 and threaded into the nut. Also, in order that the nut may be free of any restriction upon said self-aligning movements, there is preferably provided a small amount of axial clearance of the head 72 cap C and the opposed end of shell B.

Within the shell B the socket 27 is defined by a counterbore which extends, full diameter, to the inner end of the shell and terminates at the lip 26. This makes it possible to fabricate the shell B as a screw-machine or automatic lathe product, with an axially projecting skirt 71 at its inner end, for retaining the cap C.

In the installation of the insert, the shell B is held by suitable holding means such as a holder on the injection gun, until the potting material E is sufficiently set to support the insert in the installed position.

The initial step of positioning the insert in the opening 15 may be accomplished by attaching the insert to the nozzle of an injection gun for the potting compound and utilizing an anvil on such nozzle to establish the flush relationship with the skin sheet 10 as described more in detail in the pending application S.N. 189,194 of Frederick W. Rohe and Charles S. Phelan, filed April 20, 1962, now Patent No. 3,282,015.

The end cap C is retained in a receptacle defined by an axially projecting skirt 71 on the inner head 22 of shell B. The receptacle may be formed initially as a cylindrical counterbore in head 22, to loosely receive a flat radial peripheral flange 75 on cap C, and after the cap C has been dropped into the receptacle, the skirt 71 is swaged inwardly around the flange 75 to the converging frustoconical form shown in FIG 8. The flange 71 is thereby shrunk into engagement with the edge of flange 75 such as to retain the cap and to seal the end of shell B against seepage of potting compound into the shell when installed in the sandwich A.

Cap C has a bottom or end wall 73 and a polyhedral lateral wall 74 which cooperatively define a non-circular socket in which is received the correspondingly non-circular head 72 on floating nut D, with an adequate torque-anchorage coupling. An example of a suitable non-circular configuration for adequate torque-anchorage and for satisfactory fabrication, the head 72 and wall 74 may be square as shown, although it is to be understood that the form of the head and socket wall can be elongated rather than a regular polyhedron, or can have more or fewer sides than four.

Flange 75 may be tightly gripped within skirt 71 so as to receive torque-anchorage from shell B, and may have a roughened or striated peripheral surface may be formed by knurling, or, more simply, by punching the cap C in a die having a roughly-finished cutting edge or edges for blanking the periphery of flange 75. Such striated surface is indicated at 76 in the modified flange 75a of FIG. 10. Alternatively, the flange 75 may have a relatively smooth periphery and may be retained in skirt 71 with only minor torque-anchorage coupling. In any event, the embedding of the cap C in the potting compound may be relied upon to a greater or lesser extent for anchoring the cap C against turning.

Nut D has its tubular body 41 and head 7 loosely received within shell counterbore 27 and the socket of cap C, with adequate clearances for self-aligning movements.

I claim:

1. For installation in a lightweight sandwich panel having spaced skin sheets joined to opposite sides of a lightweight core in which there is provided a hole extending into said core from an opening in one of said skin sheets, a fastener insert comprising: a shell including a head proportioned to be fitted in said skin sheet opening and having a central aperture to receive a bolt, a tubular body projecting axially from said head, and a head defining an open inner end of said tubular body, said head having an axially-projecting skirt defining a receptacle, a cap of sheet material closing said open inner end of said tubular body, said cap having a peripheral flange mounted within said receptacle and having a lateral wall defining a non-circular socket; and a nut having an internally threaded tubular body received within said shell and a non-circular head loosely received in and mating with said socket to limit rotation of said nut relative to said shell while permitting limited self-aligning movements thereof during installation of a bolt.

2. An insert as defined in claim 1, wherein said cap flange and receptacle are circular, and wherein said skirt is shrunk around said flange to frusto-conical form such as to retain said flange securely in said receptacle.

3. An insert as defined in claim 2, wherein said skirt is in compressive engagement with the periphery of said cap flange to provide torque-anchoring coupling.

4. An insert as defined in claim 3, wherein said cap flange has a roughened periphery which is embedded in the inner wall of said skirt.

5. An insert as defined in claim 1, wherein said cap flange and receptacle are circular; and in combination therewith, a body of solidified potting compound in which said shell and cap are embedded, said lateral wall of the cap having a non-circular external contour corresponding to that of said socket and coupled to said body of compound with a torque-anchorage coupling.

References Cited by the Examiner

UNITED STATES PATENTS

| 2,607,446 | 8/1952 | Rosan | 189—36 |
| 3,016,578 | 1/1962 | Rohe | 52—617 X |
| 3,019,865 | 2/1962 | Rohe | 52—617 |

FOREIGN PATENTS

| 812,540 | 4/1959 | Great Britain. |

FRANK L. ABBOTT, *Primary Examiner.*

RICHARD W. COOKE, Jr., *Examiner.*

A. C. PERHAM, *Assistant Examiner.*